United States Patent
Son et al.

(10) Patent No.: US 11,352,259 B2
(45) Date of Patent: Jun. 7, 2022

(54) METHOD OF PRODUCING CARBON NANOTUBES IN FLUIDIZED BED REACTOR

(71) Applicants: SK Innovation Co., Ltd., Seoul (KR); SK Global Chemical Co., Ltd., Seoul (KR)

(72) Inventors: Sung Real Son, Daejeon (KR); Ji Min Kim, Daejeon (KR); Min Ji Sung, Daejeon (KR); Sang Uk Kim, Daejeon (KR); Jung Yul Son, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 0 days.

(21) Appl. No.: 15/988,432

(22) Filed: May 24, 2018

(65) Prior Publication Data
US 2018/0354800 A1 Dec. 13, 2018

(30) Foreign Application Priority Data
Jun. 8, 2017 (KR) .................. 10-2017-0071867

(51) Int. Cl.
*C01B 32/162* (2017.01)
*B01J 8/24* (2006.01)
*B82Y 40/00* (2011.01)

(52) U.S. Cl.
CPC ............. *C01B 32/162* (2017.08); *B01J 8/24* (2013.01); *B01J 2208/0007* (2013.01); *B01J 2208/00061* (2013.01); *B82Y 40/00* (2013.01); *C01B 2202/04* (2013.01); *C01B 2202/36* (2013.01)

(58) Field of Classification Search
CPC ........... C01B 32/162; B01J 8/24; B82Y 40/00
See application file for complete search history.

(56) References Cited

U.S. PATENT DOCUMENTS

| | | | | |
|---|---|---|---|---|
| 8,562,937 | B2 * | 10/2013 | Carruthers | B01J 20/20 423/447.3 |
| 8,911,701 | B2 * | 12/2014 | Gaillard | B82Y 30/00 423/447.1 |
| 9,050,572 | B2 | 6/2015 | Buchholz et al. | |
| 9,321,651 | B2 * | 4/2016 | Choi | B01J 23/8885 |
| 2010/0207053 | A1 * | 8/2010 | Ryu | C01B 32/162 252/71 |

(Continued)

FOREIGN PATENT DOCUMENTS

| | | |
|---|---|---|
| KR | 1020100073149 A | 7/2010 |
| KR | 1020140034159 A | 3/2014 |
| KR | 1020140110100 A | 9/2014 |

OTHER PUBLICATIONS

Jeong, Seong Woo, Seong Yong Son, and Dong Hyun Lee. "Synthesis of multi-walled carbon nanotubes using Co-Fe-Mo/Al2O3 catalytic powders in a fluidized bed reactor." Advanced Powder Technology 21.2 (2010): 93-99.*

(Continued)

*Primary Examiner* — Richard M Rump
(74) *Attorney, Agent, or Firm* — The Webb Law Firm

(57) ABSTRACT

A method of producing carbon nanotubes in a fluidized bed reactor includes preparing a carbon nanotube by supplying a catalyst and a carbon source to an interior of the fluidized bed reactor having an internal pressure of 0.5 barg to 1.2 barg (gauge pressure), thereby improving the yield and purity of carbon nanotubes.

3 Claims, 1 Drawing Sheet

(56) References Cited

U.S. PATENT DOCUMENTS

2015/0086468 A1* 3/2015 Noyes .................. B01J 37/16
423/445 R

OTHER PUBLICATIONS

Morançais et al., "A parametric study of the large scale production of multi-walled carbon nanotubes by fluidized bed catalytic chemical vapor deposition", Carbon, 2007, pp. 624-635, vol. 45, No. 3.

* cited by examiner

METHOD OF PRODUCING CARBON NANOTUBES IN FLUIDIZED BED REACTOR

CROSS-REFERENCE TO RELATED APPLICATION

This application claims priority to Korean Patent Application No. 10-2017-0071867 filed Jun. 8, 2017, the disclosure of which is hereby incorporated in its entirety by reference.

BACKGROUND OF THE INVENTION

Field of the Invention

The present disclosure relates to a method of producing carbon nanotubes in a fluidized bed reactor.

Description of Related Art

Carbon nanotubes have very low resistance values due to one-dimensional structure and an electrical structure thereof, inherent to graphite. For example, the resistance value of single-wall carbon nanotubes is only $\frac{1}{100}$ of that of copper. In addition, the current carrying capacity of carbon nanotubes has a unique electrical characteristic, being 1,000 times that of copper. Furthermore, carbon nanotubes have an sp2 bond between carbon and carbon, and thus, have relatively high stiffness and strength. Carbon nanotubes are characterized in that the degree of thermal conductivity thereof is twice that of diamond and the carbon nanotubes have excellent thermal stability up to 750° C. in the atmosphere. Carbon nanotubes have the properties of a conductor or a semiconductor depending on a winding shape. Further, energy gaps of carbon nanotubes vary, depending on diameters, and a unique quantum effect thereof is exhibited due to the one-dimensional structure.

Carbon nanotubes are under active research in the field of displays, memory devices, hydrogen storage materials and nanocomposite materials due to having such a unique structure and characteristics. Further, carbon nanotubes may be applied to electrical and electronic products by providing electrical conductivity to engineering plastic composites, and may be used as a high-cost material for shielding electromagnetic waves and preventing electrification. Such carbon nanotubes are generally expensive, and thus, carbon nanotubes are required to be synthesized in a large amount at relatively low cost in order to be useful in various fields.

Carbon nanotubes are synthesized through various methods, such as electric discharge, laser deposition, chemical vapor deposition or the like. In the case of the chemical vapor deposition method, carbon nanotubes may generally be produced by dispersing and reacting metal catalyst particles and a hydrocarbon-based raw material gas in a high-temperature fluidized bed reactor. For example, the metal catalyst reacts with the raw material gas while floating in the fluidized bed reactor by the raw material gas, to grow carbon nanotubes.

However, the formation of carbon nanotubes and the properties of the formed carbon nanotubes may still be affected in a complex manner, by a combination of metal components or various metal components used as a catalyst, a support material, interaction between a catalyst and a support, a reactant gas and partial pressure thereof, mixing of hydrogen or additional gas, reaction temperature and residence time, and the reactor used. Industrial processes are required to be suitable for production processes.

SUMMARY OF THE INVENTION

An aspect of the present disclosure is to provide a method of producing carbon nanotubes having improved yield and purity.

According to an aspect of the present disclosure, a method of producing carbon nanotubes in a fluidized bed reactor includes preparing a carbon nanotube by supplying a catalyst and a carbon source to an interior of the fluidized bed reactor having an internal pressure of 0.5 barg to 1.2 barg (gauge pressure).

The fluidized bed reactor may have an internal temperature of 530° C. to 1100° C.

The carbon source may be one or more selected from the group consisting of saturated and unsaturated hydrocarbons having 1 to 4 carbon atoms.

The catalyst may be a metal catalyst.

The metal catalyst may be one metal selected from the group consisting of iron (Fe), molybdenum (Mo), titanium (Ti), vanadium (V), chromium (Cr), manganese (Mn), nickel (Ni), cobalt (Co), copper (Cu), cadmium (Cd), zinc (Zn), ruthenium (Ru), lead (Pd), silver (Ag), platinum (Pt) and gold (Au), or any one selected from alloys thereof.

The carbon nanotubes may have a diameter of 0.4 nm to 10 nm.

The carbon nanotube may be comprised of 1 to 10 layers.

BRIEF DESCRIPTION OF THE DRAWINGS

The above and other aspects, features, and advantages of the present disclosure will be more clearly understood from the following detailed description, taken in conjunction with the accompanying drawings, in which.

DESCRIPTION OF THE INVENTION

Figure 1:
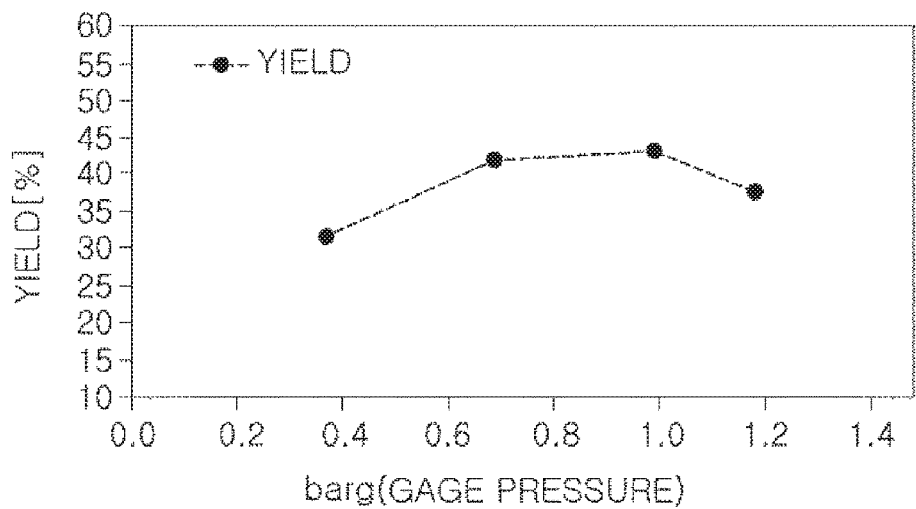
FIG. 1 is a graph showing the yield of carbon nanotubes according to internal pressure of a fluidized bed reactor according to an exemplary embodiment in the present disclosure.

Hereinafter, various exemplary embodiments in the present disclosure will be described with reference to the accompanying drawings. However, exemplary embodiments in the present disclosure may be variously modified, and the scope of the present invention is not limited to exemplary embodiments described below.

According to an exemplary embodiment, a method of producing carbon nanotubes in a fluidized bed reactor may be provided.

According to an exemplary embodiment, a method of producing carbon nanotubes in a fluidized bed reactor is provided. The method of producing carbon nanotubes may include an operation of supplying a catalyst and a carbon source to an interior of a fluidized bed reactor having an internal pressure of 0.5 to 1.2 barg (gauge pressure) to produce carbon nanotubes.

The fluidized bed reactor may be a reactor device that may be used to perform various multiphase chemical reactions. In a fluidized bed reactor, a fluid, for example, a gas or liquid, may react with a particulate solid material that is generally a catalyst having the shape of a relatively small sphere. The fluid may flow at a rate sufficient to float the solid material such that the solid material may behave similarly to that of a fluid.

The method of producing carbon nanotubes according to an exemplary embodiment may use the fluidized bed reactor to produce carbon nanotubes. A catalyst and a carbon source may be provided to the fluidized bed reactor. The catalyst may correspond to a solid material in a particulate state, and the carbon source may correspond to a fluid. Thus, as the carbon source may flow at a rate sufficient to suspend the catalyst within the fluidized bed reactor, the catalyst may behave similarly to the behavior of the carbon source.

Thus, the catalyst may be uniformly distributed in the fluidized bed reactor, such that characteristics of contact between the catalyst and the carbon source may be relatively excellent, and the heat may be easily diffused during an exothermic reaction. In addition, the residence time of the carbon nanotubes as an objective product and the catalyst may have a relatively important influence on the purity and yield of the carbon nanotubes. For example, as the residence time of catalyst and carbon nanotubes may be secured in the fluidized bed reactor, the carbon nanotubes may be produced to have relatively high yield and purity.

According to an exemplary embodiment in the present disclosure, the fluidized bed reactor may have an internal pressure of 0.5 to 1.2 barg (gauge pressure), and in detail, may have an internal pressure of 0.7 to 1.0 barg. In the case of the related art, for example, when carbon nanotubes are produced in a fluidized bed reactor, a reaction was performed under atmospheric pressure conditions. In this case, in the case that carbon nanotubes are produced under pressurized conditions, as a mol concentration of a product increases due to hydrogen gas generated after the reaction, there may be an adverse effect in terms of a reaction rate, while a mol concentration of a reactant, a carbon source, may decrease.

However, the pressurized conditions having an adverse effect in terms of the reaction rate may have an effect of reducing the size of bubbles generated in a fluidization reactor. As a result, the contact between the catalyst and the carbon source may be increased, and the yield and purity of the carbon nanotube, a product, may be improved.

In results of research into carbon nanotubes produced in a state in which the interior of the fluidized bed reactor is controlled under pressurized conditions, by using characteristics that when the internal pressure of a fluidized bed reactor is increased, it may be disadvantageous in terms of a reaction rate, but an excellent effect may be obtained in terms of the contact between a catalyst and a carbon source, the inventors of the present disclosure have found that the yield and purity of carbon nanotubes may be significantly improved when the internal pressure of the fluidized bed reactor is 0.5 to 1.2 barg (gauge pressure).

The gauge pressure corresponds to pressure, at which when a reference of atmospheric pressure is zero (0), pressure higher than the reference of atmospheric pressure, zero, is represented as being positive and pressure lower than that is represented as being negative. For example, the gauge pressure indicates a difference between an absolute pressure and atmospheric pressure.

In the method of producing carbon nanotubes according to an exemplary embodiment of the present disclosure, internal pressure of the fluidized bed reactor may be 0.5 to 1.2 barg, in detail, 0.7 to 1.0 barg. If the internal pressure of the fluidized bed reactor does not satisfy 0.5 to 1.2 barg, the yield and purity of the carbon nanotubes may be sharply deteriorated and uneconomical.

Although the carbon source supplied to the fluidized bed reactor may be provided in a gaseous state, the carbon source may also be supplied, by supplying a liquid or solid raw material to the reactor at room temperature and by evaporating the raw material by heat in a heating atmosphere in the reactor. It is not particularly limited as long as the carbon source can react with a catalyst to produce carbon nanotubes. For example, the carbon source may be one or more selected from the group consisting of saturated and unsaturated hydrocarbons having 1 to 4 carbon atoms, and may be gaseous ethylene in consideration of commercial availability.

The catalyst supplied to the fluidized bed reactor may be a metal catalyst, for example, iron (Fe), molybdenum (Mo), titanium (Ti), vanadium (V), chromium (Cr), manganese (Mn), nickel (Ni), cobalt (Co), copper (Cu), cadmium (Cd), zinc (Zn), ruthenium (Ru), lead (Pd), silver (Ag), platinum (Pt) and gold (Au), or alloys thereof.

The fluidized bed reactor may have an internal temperature of 530° C. to 1100° C., in detail, 600° C. to 900° C. If the internal temperature of the fluidized bed reactor is less than 530° C., the reaction to produce carbon nanotubes may not be performed. If the internal temperature of the fluidized bed reactor exceeds 1100° C., the carbon source may be denatured due to an excessively high temperature, to thus cause the occurrence of by-product.

The carbon nanotubes produced by the method of producing carbon nanotubes according to an exemplary embodiment may have a diameter of 0.4 to 10 nm. The diameter of the carbon nanotube may be determined by the kind and size of the catalyst, and is not limited to the value described above. A length of the carbon nanotube may be determined by a synthesis time. In the case of applications requiring relatively short carbon nanotubes, the synthesis time may be reduced. In the usage requiring relatively long carbon nanotubes, the synthesis time may be increased. The carbon nanotubes may also be formed of a single layer or a plurality of layers. For example, the carbon nanotubes may be comprised of 1 to 10 layers.

Hereinafter, exemplary embodiments in the present disclosure will be described in more detail. The following embodiments are provided for illustrative examples, and should not be construed as limiting the scope of the invention.

EMBODIMENT

As a catalyst, 90 g of iron-cobalt alloy having a diameter of 130 μm and a density of 1300 kg/m$^3$ were put into a fluidized bed reactor, and the inside of the fluidized bed reactor was heated to 690° C. As a result, an initial temperature of the catalyst was 690° C. Ethylene gas was fed to the fluidized bed reactor, at a temperature of 530° C., and the reaction was performed for 30 minutes, while controlling a fluidization rate thereof in the fluidized bed reactor to be at 26 cm/s. For smooth fluidization, 250 g of carbon nanotubes prepared by the same method were filled, and the catalyst was filled to maintain the same specific velocity according to a flow rate.

Figure 2:
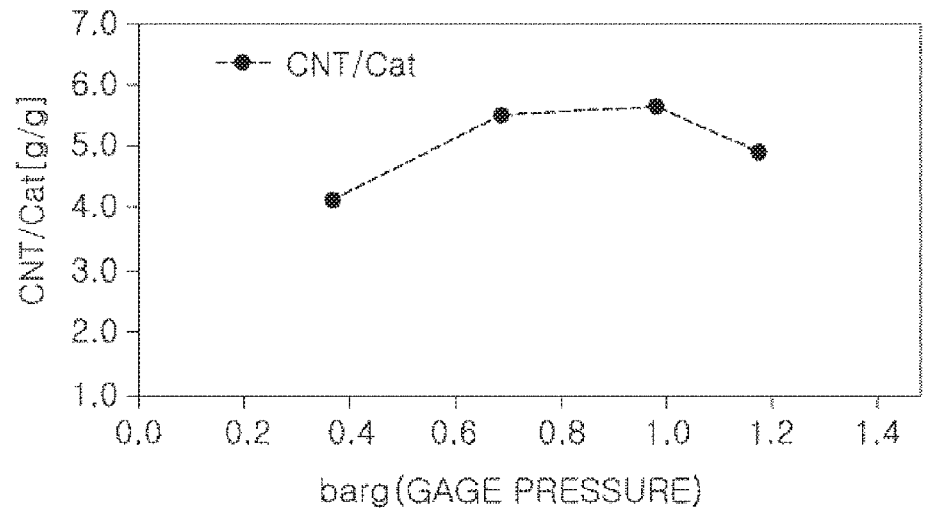
FIG. 2 is a graph showing carbon nanotube production per catalyst according to internal pressure of a fluidized bed reactor according to an exemplary embodiment in the present disclosure.
Figure 3:
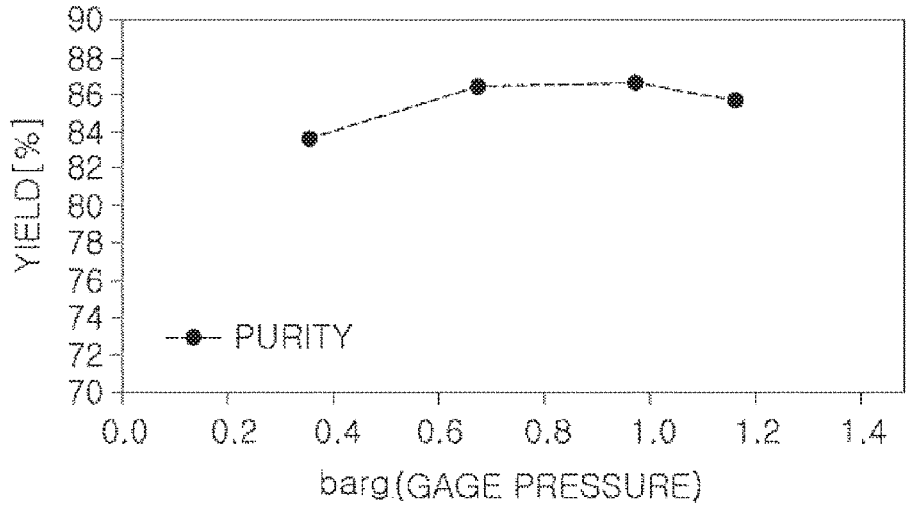
FIG. 3 is a graph showing the purity of carbon nanotubes according to internal pressure of a fluidized bed reactor according to an exemplary embodiment in the present disclosure.

In this case, the internal pressures of the fluidized bed reactor was controlled to 0.4, 0.7, 1.0, and 1.2 barg (gauge pressure), respectively, to measure the yield of carbon nanotubes, a production amount of carbon nanotube per catalyst, and the purity of carbon nanotube, based on the internal pressures of the fluidized bed reactor, and the results are shown in graphs of FIGS. 1 to 3. On the other hand, it was confirmed that the carbon nanotubes produced by the process in the fluidized bed reactor for 30 minutes had a particle diameter of 400 nm and a density of 150 kg/m$^3$.

FIG. 1 is a graph showing the yield of carbon nanotubes according to the internal pressure of the fluidized bed reactor. According to the graph, it was confirmed that the yield was significantly high at 0.5 to 1.2 barg, in detail, 0.7 to 1.0 barg. FIG. 2 is a graph showing carbon nanotube production per catalyst according to the internal pressure of the fluidized bed reactor. According to the graph, it was confirmed that the carbon nanotube production per catalyst was significantly high at 0.7 to 1.0 barg. Further, FIG. 3 is a graph showing the purity of carbon nanotubes according to the internal pressure of the fluidized bed reactor, and it was confirmed that the purity of carbon nanotubes per catalyst was significantly high at 0.7 to 1.0 barg.

As set forth above, a method of producing carbon nanotubes in a fluidized bed reactor according to an exemplary embodiment may have an effect of improving the yield and purity of carbon nanotubes.

While exemplary embodiments have been shown and described above, it will be apparent to those skilled in the art that modifications and variations could be made without departing from the scope of the present invention as defined by the appended claims.

What is claimed is:

1. A method of producing multi-wall carbon nanotubes in a fluidized bed reactor, the method consisting of;

preparing a multi-wall carbon nanotube by supplying an iron-cobalt alloy catalyst and a carbon source to an interior of the fluidized bed reactor having an internal pressure of 0.7 barg to 1.0 barg (gauge pressure), wherein the carbon source is one or more selected from the group consisting of saturated and unsaturated hydrocarbons having 1 to 4 carbon atoms.

2. The method of claim 1, wherein the fluidized bed reactor has an internal temperature of 530° C. to 1100° C.

3. The method of claim 1, wherein the multi-wall carbon nanotubes have a diameter of 0.4 nm to 10 nm.

* * * * *